US012639510B2

(12) United States Patent
Greisen

(10) Patent No.: US 12,639,510 B2
(45) Date of Patent: May 26, 2026

(54) LEGISLATIVE CODE VERSIONING SYSTEM

(71) Applicant: Open Law Library, Washington, DC (US)

(72) Inventor: David Jonathon Greisen, Washington, DC (US)

(73) Assignee: Open Law Library, Washington, DC (US)

( * ) Notice: Subject to any disclaimer, the term of this patent is extended or adjusted under 35 U.S.C. 154(b) by 9 days.

(21) Appl. No.: 17/860,986

(22) Filed: Jul. 8, 2022

(65) Prior Publication Data

US 2023/0011529 A1    Jan. 12, 2023

Related U.S. Application Data

(60) Provisional application No. 63/220,857, filed on Jul. 12, 2021.

(51) Int. Cl.
*G06F 40/197* (2020.01)
*G06F 16/93* (2019.01)
*G06F 16/955* (2019.01)
*G06F 40/14* (2020.01)
(Continued)

(52) U.S. Cl.
CPC .......... *G06F 40/197* (2020.01); *G06F 16/955* (2019.01); *G06Q 50/18* (2013.01)

(58) Field of Classification Search
CPC ..... G06F 40/197; G06F 16/955; G06Q 50/18; G06K 7/1417; G06K 7/1413; G06K 7/1434; G06K 7/1408
See application file for complete search history.

(56) References Cited

U.S. PATENT DOCUMENTS

| | | | |
|---|---|---|---|
| 8,797,603 B1 * | 8/2014 | Dougherty | ......... H04N 1/32133 |
| | | | 358/1.15 |
| 11,042,692 B1 | 6/2021 | Greisen et al. | |
| 2003/0135520 A1 | 7/2003 | Mitchell et al. | |

(Continued)

FOREIGN PATENT DOCUMENTS

WO    WO 2018/189647    10/2018

OTHER PUBLICATIONS

International Search Report and Written Opinion for International Application No. PCT/US2022/036563, Notification mailed Nov. 9, 2022.

*Primary Examiner* — Mustafa A Amin
(74) *Attorney, Agent, or Firm* — Knobbe, Martens, Olson & Bear, LLP

(57) ABSTRACT

A legislative code versioning system that overcomes various technical deficiencies is described herein. For example, the system can allow users to see which specific updates to a printable copy of a legislative code have occurred since the creation of that printable copy. A computer-readable address that, when read by a computing device, links the computing device to a digital version of the printable copy may be embedded into the publication. The digital version can be depicted in a content page in a network-accessible publication format that displays redlines, annotations, markings, or other representations of change that track differences between two or more versions of the legislative code. Alternatively or in addition, the same or a separate embedded CRA can, when read, link a user device to an unmarked publication of the legislative code.

20 Claims, 4 Drawing Sheets

(51) Int. Cl.
   *G06F 40/169*      (2020.01)
   *G06Q 50/18*       (2012.01)

(56)                References Cited

U.S. PATENT DOCUMENTS

2004/0223648 A1 * 11/2004 Hoene ................... G06F 40/194
                                                       382/218
2013/0254126 A1    9/2013 Koenig et al.
2014/0032913 A1 *  1/2014 Tenenboym .......... H04L 9/3247
                                                       715/764
2018/0113862 A1    4/2018 Glover
2019/0372769 A1 * 12/2019 Fisher ................... H04L 9/3226
2020/0159839 A1 *  5/2020 Chapin ................. G06F 16/113
2020/0252210 A1 *  8/2020 Sharfman ................. H04L 9/14

* cited by examiner

VERSION CONTROL SYSTEM
120

CRA GENERATOR
121

DATA PROCESSOR
122

CODE PUBLISHER
123

PUBLICATIONS
DATA STORE
125

SEMANTIC
INFORMATION
DATA STORE
126

METADATA DATA
STORE
124

PUBLISHING
DEVICE
130

NETWORK
110

USER DEVICES
102

100

200

204

202

See updates    Print current version

Chapter 00.00 LEGISLATIVE CODE 00.00.00 SECTION ONE

[Text of section one]

00.00.01 SECTION TWO

[Text of section two]

00.00.02 SECTION THREE

[Text of section three]

00.00.03 SECTION FOUR

[Text of section four]

LEGISLATIVE CODE VERSIONING SYSTEM

CROSS-REFERENCE TO RELATED APPLICATIONS

This application claims a priority benefit under 35 U.S.C. § 119 to U.S. Provisional Patent Application No. 63/220,857, filed on Jul. 12, 2021, and titled "LEGISLATIVE CODE VERSIONING SYSTEM," which is hereby incorporated by reference herein in its entirety.

BACKGROUND

Legislative code, which may be a codified version of laws passed by a legislative body, is generally published in a print volume. The print volumes may be published periodically to reflect changes in the legislative code. The print volumes, however, each indicate a version of the legislative code that was current at the time of publishing. In some cases, the legislative code may include annotations identifying one or more laws that were passed that changed a particular title, chapter, section, sub-section, and/or the like of the legislative code. Unfortunately, a reader may be tasked with reading the identified passed law(s) to determine how the passed law(s) changed the legislative code. Thus, it may be difficult for a reader to identify how the legislative code has changed from one print volume to another.

The print volumes can also be problematic because the content included therein may be out of date. For example, the print volume may identify a date by which the legislative code published therein is current. The date, however, may be days, months, and/or years before a current time. A reader may have no way of knowing whether the print volume includes a current version of the legislative code, or whether the legislative code has changed since the print volume was published.

SUMMARY

The systems, methods, and devices described herein each have several aspects, no single one of which is solely responsible for its desirable attributes. Without limiting the scope of this disclosure, several non-limiting features will now be discussed briefly.

One aspect of the disclosure provides a system for versioning legislative code. The system comprises memory storing computer-executable instructions. The system further comprises a hardware processor in communication with the memory, wherein the computer-executable instructions, when executed by the hardware processor, cause the hardware processor to: generate metadata for machine-readable data, wherein the machine-readable data comprises textual information for a first version of a legislative code; generate a computer-readable optical code associated with the legislative code, wherein the computer-readable optical code, when read by a user device, causes the user device to access the first version of the legislative code or a second version of the legislative code, wherein the second version of the legislative code is more recent than the first version of the legislative code; convert the machine-readable data into a format compatible with a publication medium; embed the metadata and computer-readable optical code into the publication medium; and in response to an indication that the user device has read the computer-readable optical code, transmit the first version of the legislative code or the second version of the legislative code to the user device for display.

The system of the preceding paragraph can include any sub-combination of the following features: where the computer-readable optical code, when read by the user device, causes the user device to access the second version of the legislative code with markings indicating a difference between the first version of the legislative code and the second version of the legislative code; where the computer-readable optical code, when read by the user device, causes the user device to access the second version of the legislative code without markings indicating a difference between the first version of the legislative code and the second version of the legislative code; where the metadata comprises at least one of an annotation, a reference, or a hyperlink associated with the first version of the legislative code; where the publication medium comprises at least one of a digital publication accessible via a network or a printable publication; where the second version of the legislative code is a most recent version of the legislative code; where the second version of the legislative code is a user-selected version of the legislative code; where the computer-readable optical code comprises one of a quick response (QR) code, a barcode, or a uniform resource locator (URL); and where the system comprises a version control system.

Another aspect of the disclosure provides a computer-implemented method for versioning legislative code. The computer-implemented method comprises: generating metadata for machine-readable data, wherein the machine-readable data comprises textual information for a first version of a legislative code; generating a computer-readable optical code associated with the legislative code, wherein the computer-readable optical code, when read by a user device, causes the user device to access the first version of the legislative code or a second version of the legislative code, wherein the second version of the legislative code is more recent than the first version of the legislative code; converting the machine-readable data into a format compatible with a publication medium; embedding the metadata and computer-readable optical code into the publication medium; and in response to an indication that the user device has read the computer-readable optical code, transmitting the first version of the legislative code or the second version of the legislative code to the user device for display.

The computer-implemented method of the preceding paragraph can include any sub-combination of the following features: where the computer-readable optical code, when read by the user device, causes the user device to access the second version of the legislative code with markings indicating a difference between the first version of the legislative code and the second version of the legislative code; where the computer-readable optical code, when read by the user device, causes the user device to access the second version of the legislative code without markings indicating a difference between the first version of the legislative code and the second version of the legislative code; where the metadata comprises at least one of an annotation, a reference, or a hyperlink associated with the first version of the legislative code; where the publication medium comprises at least one of a digital publication accessible via a network or a printable publication; where the second version of the legislative code is a most recent version of the legislative code; where the second version of the legislative code is a user-selected version of the legislative code; and where the computer-readable optical code comprises one of a quick response (QR) code, a barcode, or a uniform resource locator (URL).

Another aspect of the disclosure provides a non-transitory computer readable medium storing instructions, wherein the instructions, when executed by a computing device, causes the computing device to: generate metadata for machine-readable data, wherein the machine-readable data comprises textual information for a first version of a legislative code; generate a computer-readable optical code associated with the legislative code, wherein the computer-readable optical code, when read by a user device, causes the user device to access the first version of the legislative code or a second version of the legislative code, wherein the second version of the legislative code is more recent than the first version of the legislative code; convert the machine-readable data into a format compatible with a publication medium; embed the metadata and computer-readable optical code into the publication medium; and in response to an indication that the user device has read the computer-readable optical code, transmit the first version of the legislative code or the second version of the legislative code to the user device for display.

The non-transitory computer readable medium of the preceding paragraph can include any sub-combination of the following features: where the computer-readable optical code, when read by the user device, causes the user device to access the second version of the legislative code with markings indicating a difference between the first version of the legislative code and the second version of the legislative code; and where the computer-readable optical code, when read by the user device, causes the user device to access the second version of the legislative code without markings indicating a difference between the first version of the legislative code and the second version of the legislative code.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF THE PREFERRED EMBODIMENT

Figure 1:
FIG. 1 is a block diagram of an illustrative operating environment in which a legislative code versioning system implements techniques to generate metadata from markup language code, embed computer-readable addresses (CRAs) into legislative code documents, and publish legislative codes redlined to show changes between different versions of the code.

As described above, print volumes lack vital information that may be useful to a reader in understanding how laws have changed and/or the current state of the law. In some cases, the legislative code may be available via a network. For example, a reader can access the legislative code by using a computing device to visit a particular content page (e.g., a network page, a web page, etc.) dedicated to the legislative code. The content page may even link to previous versions of the legislative code. While the network-accessible version of the legislative code may indicate a current version of the law, it may be overly burdensome to ask the reader to retrieve a computing device, perform a search to find a content page dedicated to the legislative code, and perform additional navigational steps on the content page in an attempt to find differences between two versions of the legislative code or to identify the current version of the legislative code.

To reduce this burden, print volumes can be coupled with a digital image or an electronic file of the content of the print volume via a computer-readable address (CRA) (e.g., a quick response (QR) code, a barcode, and/or any other computer-readable character, image, object, symbol, shape, etc.). For example, the CRA can be printed on one or more pages in a print volume. The CRA, when scanned, captured, or otherwise read by a computing device, can direct the computing device to a digital version of the print volume. In particular, a browser or application running on the computing device can be directed to a content page that depicts some or all of the content of the print volume. As an illustrative example, reading the CRA printed on one page in the print volume may direct a computing device to a content page that depicts a digital version of the content on the page in the print volume in which the CRA is printed. As another illustrative example, reading the CRA printed on one page in the print volume may direct a computing device to a content page that depicts a digital version of at least some of the content in the print volume, which may or may not include the content on the page in the print volume in which the CRA is printed.

Printing a CRA on a page in the print volume and using the CRA to direct a computing device to a digital version of at least some of the print volume, however, may still be deficient. For example, the CRA may direct the computing device to a digital version of at least some of the print volume and depict a version of the legislative code at the time of printing the print volume. The computing device may not depict how the legislative code has changed over time. Furthermore, directing a computing device to a digital version of at least some of the print volume may not be sufficient to provide easy access to prior and/or later versions of the legislative code. In addition, the CRA and corresponding content page does not provide any mechanism for a reader or user to print out only the changed portions of the legislative code. Rather, typical content pages merely allow a reader to print out an entire title, chapter, section, etc.

In addition to the technical deficiencies described above, many jurisdictions do not update their legislative codes on a regular schedule, so it may not be possible to determine if the printed volume has been changed after every edit to the code or if a revision to the code has been skipped. Thus, a mechanism to version and link a code's digital data with multiple publication formats, such as printable or network-accessible formats, may be beneficial.

Accordingly, disclosed herein is a legislative code versioning system that overcomes the technical deficiencies described above. The present system can allow users to see which specific updates to a printable copy of a legislative code have occurred since the creation of that printable copy. A CRA (e.g., a QR code, a barcode, and/or any other computer-readable character, image, object, symbol, shape, etc.) that, when read by a computing device, links the computing device to a digital version of the printable copy may be embedded (e.g., printed or coupled via an adhesive like glue, tape, etc.) into the publication. The digital version can be depicted in a content page in a network-accessible publication format (e.g., hypertext markup language (HTML), extensible markup language (XML), Java, JavaScript, Python, etc.) that displays redlines, annotations, markings, or other representations of change that track differences between two or more versions of the legislative code. As an illustrative example, the digital version can be depicted in a content page in a network-accessible publication format that displays representations of change that track differences between a version of the legislative code in the printable copy and a different version of the legislative code (e.g., a current version of the legislative code). The content page may be accessed through any network browser application via any computing or user device that can scan, capture, or otherwise read CRAs. For example, a user device may be able to scan, capture, or otherwise read a CRA if the user device includes a camera and/or stores computer-executable instructions that, when executed, are capable of causing the user device to process the scanned, captured, or read data. The content page may allow a user to select which version(s) of the legislative code to compare with a version currently depicted in the content page (e.g., the version corresponding to the print volume that includes the CRA). The version(s) selected for comparison may either predate the version currently depicted in the content page or be a version later than the version currently depicted in the content page. Alternatively or in addition, the same or a separate embedded CRA can, when read, link a user device to an unmarked publication of the legislative code (e.g., a version without redlining, annotations, markings, or other representations of change that track differences between two or more versions of the legislative code). The user device and/or content page may also allow a user to choose which version of the unmarked legislative code to view. The user can thus choose to view and/or print a portion of the legislative code that may be an updated version of the legislative code printed in the print volume, and insert the printed portion into the print volume.

Further, after being linked to the content page, the user device can allow a user to view metadata associated with the printable copy, such as what collections the legislative code belongs to or external documents referenced by the legislative code. These documents in different publication formats (e.g., digital format, print format, etc.) can be linked together because the documents are generated with the same versioned textual and semantic data.

While the legislative code versioning system is described herein as processing laws and/or codes (e.g., a legislative code), this is not meant to be limiting. For example, the legislative code versioning system described herein can process any legal document that is a compilation of other legal documents and/or is amended by other legal documents, such as contracts, regulations, codes of regulation, laws, rules, memoranda of agreement, and/or the like. The legislative code validation and publication system can process such a legal document to generate amended or revised legal documents.

The foregoing aspects and many of the attendant advantages of this disclosure will become more readily appreciated as the same become better understood by reference to the following detailed description, when taken in conjunction with the accompanying drawings.

Example Legislative Code Versioning Environment

FIG. 1 is a block diagram of an illustrative operating environment 100 in which a version control system 120 and/or a publishing device 130 implement techniques to generate metadata from markup language code, embed computer-readable addresses (CRAs) into legislative code documents, and publish legislative codes marked to show changes between different versions of the code. The operating environment 100 further includes various user devices 102 that may communicate with the version control system 120 via a network 110 to request a clean or marked-up updated version of the legislative code.

The publishing device 130 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The publishing device 130 may generate markup language code (e.g., XML code) with structural annotations and codification annotations for legislative code. The publishing device 130 may then update the markup language code by applying transforms dictated by the annotations. The publishing device 130 may convert the transformed markup language code into a text document, a PDF, an electronic message, and/or the like that presents the updated legislative code for publication. Further description of how the publishing device 130 can generate markup language code and publish updated versions of a legislative code can be found in U.S. patent application Ser. No. 15/893,470, entitled "ARTIFICIAL INTELLIGENCE-BASED LEGISLATIVE CODE VALIDATION AND PUBLICATION SYSTEM" and filed on Feb. 9, 2018 ("the '470 application"), which is hereby incorporated by reference herein in its entirety.

The annotations generated by the publishing device 130 may further contain information for notations or markings that show differences between legislative code modifications. For example, rather than simply replacing text from a modified legislative code, the transform may also include adding a strikethrough of the previous language being replaced and may include adding the newly introduced language in a different font, color, or format (e.g., underlining). The publishing device 130 can then convert the transformed markup language code into a publication format such that a CRA, when read by a user device 102, causes the user device 102 to display a content page that allows a user to view changes that have occurred between two or more versions of the legislative code.

The version control system 120 can be a computing system configured to perform some or all of the functionality described herein with respect to the publishing device 130. In addition, the version control system 120 may provide additional functionality, such as allowing a user device 102 to request, on-demand, a redlined version of the legislative code with markings to show differences between two or more versions of the code. For example, the version control system 120 may include various modules, components, data stores, and/or the like to provide the structure-based markup language code generation, the CRA generation, the metadata processing, and the legislative code publishing functionality described herein. For example, the version control system 120 may include a CRA generator 121, a data processor 122, a code publisher 123, a metadata data store 124, a publications data store 125, and a semantic information data store 126.

The CRA generator 121 may generate a unique CRA that can be embedded into printed or printable copies of the legislative code and, when read by a user device 102, can link the user device 102 to digital data related to the legislative code. The CRA can be read by a smart phone, tablet, or any other computing device with a camera. The CRA can be implemented as any kind of image, object, symbol, shape, or text that can be parsed by a computing device, such as a user device 102. It can be a QR code, a barcode, or text, such as a Uniform Resource Locator (URL), if optical character recognition software running on a user device 102 can parse and open those URLs. The CRA can include a link to the digital data directly or to another publication format of the document. The user device 102 that reads the CRA may extract the address from the CRA to allow a user to visit the linked content page. Users viewing a digital version of the printable copy can simply select (e.g., click on) a depicted version of the CRA to visit the address stored therein.

The address can link to a network-accessible location (e.g., a location accessible via the Internet, via a private network in which access is restricted to users or user devices 102 that have the proper permissions, etc.). Through the address, users can access a content page depicting contents of the printed legislative code in a network-accessible publication format, a most-recent version of the printed legislative code in a network-accessible publication format, and/ or a redlined copy of the printed legislative code with markings showing changes between different versions of the legislative code. The address can link to digital data for either the entire legislative code or for a specific portion of the legislative code, such as a portion of the legislative code that has been updated since the legislative code was last printed and/or since the publication date of the version of the legislative code associated with the read CRA. For instance, the CRA can relate to a portion (e.g., a title, chapter, section, sub-section, etc.) of the legislative code or to the entire legislative code.

CRAs can also link to and cause a user device 102 to display extra document metadata in a network-accessible format, such as creation dates, collections to which the legislative code belongs, and/or how many pages the legislative code should be, etc. CRAs can also be generated for externally referenced documents, such as those mentioned in citations, annotations, etc.

The data processor 122 may create metadata from underlying data in the legislative code document in order to publish the document in different formats. The data processor 122 can create rich metadata, such as annotations, references, and/or hyperlinks. The metadata can be embedded into published legislative code documents to enhance readability and allows the embedded CRA to include a working link to the digital data of the legislative code document or another form of the legislative code document's publication. The metadata generated by the data processor 122 may be stored in the metadata data store 124.

The code publisher 123 may generate user interface data that, when rendered by the user device 102 or the publishing device 130, causes the user device 102 or publishing device 130 to display a user interface depicting a content page that allows a user to select a desired legislative code, the desired legislative code at a certain date, and/or a redlined view of the desired legislative code where the markings show which changes have been made between different versions of the code. The code publisher 123 may be configured to receive annotated markup language code from the publishing device 130 and/or the user device 102 in order to generate legislative code publication. Based on the options selected by a user via the user device 102 or publishing device 130, the code publisher 123 can publish an updated legislative code by updating the user interface data such that the rendered user interface displays the requested legislative code.

Thus, the publishing device 130 and the version control system 120 may operate alone or in combination in order to generate the markup language code, to generate the annotated markup language code, and/or to publish a requested legislative code.

The metadata data store 124 can store metadata generated by the data processor 122. The metadata may include annotations, references, hyperlinks, tables of contents, and/ or CRAs associated with different versions of the legislative code document. The metadata may also include legislative information relating to the legislative code. While the metadata data store 124 is depicted as being located internal to the version control system 120, this is not meant to be limiting. For example, not shown, the metadata data store 124 can be located external to the version control system 120.

The publications data store 125 can store changes to HTML copies of the legislative code. Saving each version of the HTML code can allow users to see how the legislative code document was displayed on the content page at any point in time (e.g., to see different versions of the legislative code document). To publish the legislative code document on a content page accessible via a browser, textual and semantic data (e.g., content of the legislative code document) stored as other markup language codes (e.g. XML code) may first be converted to HTML. Thus, the version control system 120 (e.g., the data processor 122 and/or code publisher 123) may create items for storage in the publications data store 125 by applying transforms to the version control system 120 native markup language code (e.g., the textual and semantic data represented using markup language code), converting the code into HTML, and storing the result.

The publications data store 125 may also store changes made to printable copies of the legislative code document. The textual and semantic data may first be converted into a markup language that is compatible with the publication format. For example, for publication to a word processing file that can later be printed, the version control system 120 (e.g., the data processor 122 and/or the code publisher 123) may convert the version control system 120 native markup language code to a word processing file standard (e.g., the Office Open XML standard). The data processor 122 and/or code publisher 123 may also process the markup language to create metadata, such as linked tables of contents and CRAs. For example, the data processor 122 and/or code publisher 123 can parse the legislative code document, identify any annotations, references, and/or hyperlinks included therein, create a table of contents that includes some or all of the identified data, and/or provide the identified data to the CRA generator 121 so that the CRA generator 121 can generate a CRA that includes a representation of at least some of the identified data. A user device 102 and/or publishing device 130 can then load and/or display the legislative code document for printing. As with the digital version of the legislative code accessible via a browser, the data processor 122 and/or code publisher 123 can generate different versions of the printable copy of the legislative code document, such as versions that indicate the content of the legislative code at any point in time. Though different printable versions of the legislative code document may be saved in the publications data store 125, the version control system 120 may instead only store the transforms data for the legislative code and apply the relevant transforms to generate the requested version each time, which is described in greater detail in the '470 application.

The publications data store 125 may further store changes in markup language code for publication through mediums other than via the network 110 and print. While the publications data store 125 is depicted as being located internal to the version control system 120, this is not meant to be limiting. For example, not shown, the publications data store 125 can be located external to the version control system 120.

The semantic information data store 126 can store the content of the legislative code document in the form of textual and semantic data. This textual and semantic data may be in a computer-readable or machine-readable format that allows for the processing of textual and semantic data, rather than an image. Alternatively, the textual and semantic data can be stored as an image, and the data processor 122 and/or code publisher 123 can apply image recognition techniques to identify individual textual and semantic data depicted in the image. The data processor 122 and/or the code publisher 123 may use the textual and semantic data to create metadata, to create different publication formats (e.g., a network 110 based format, print format, etc.), and to store changes to the legislative code document over time. Suitable machine-readable formats can include, but are not limited to, plain text, XML, or JavaScript Object Notation (JSON).

While the semantic information data store 126 is depicted as being located internal to the version control system 120, this is not meant to be limiting. For example, not shown, the semantic information data store 126 can be located external to the version control system 120.

The version control system 120 may be a single computing device, or it may include multiple distinct computing devices, such as computer servers, logically or physically grouped together to collectively operate as a server system. The components of the version control system 120 can each be implemented in application-specific hardware (e.g., a server computing device with one or more ASICs) such that no software is necessary, or as a combination of hardware and software. In addition, the modules and components of the version control system 120 can be combined on one server computing device or separated individually or into groups on several server computing devices. The version control system 120 can include memory storing computing executable instructions and one or more hardware processors in communication with the memory, where the computer-executable instructions, when executed by the hardware processor(s), cause the version control system 120 to perform at least some of the operations described herein. In some embodiments, the version control system 120 may include additional or fewer components than illustrated in FIG. 1.

In some embodiments, the features and services provided by the version control system 120 may be implemented as web services consumable via the communication network 110. In further embodiments, the version control system 120 is provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Example Printable Legislative Code

Figure 2:
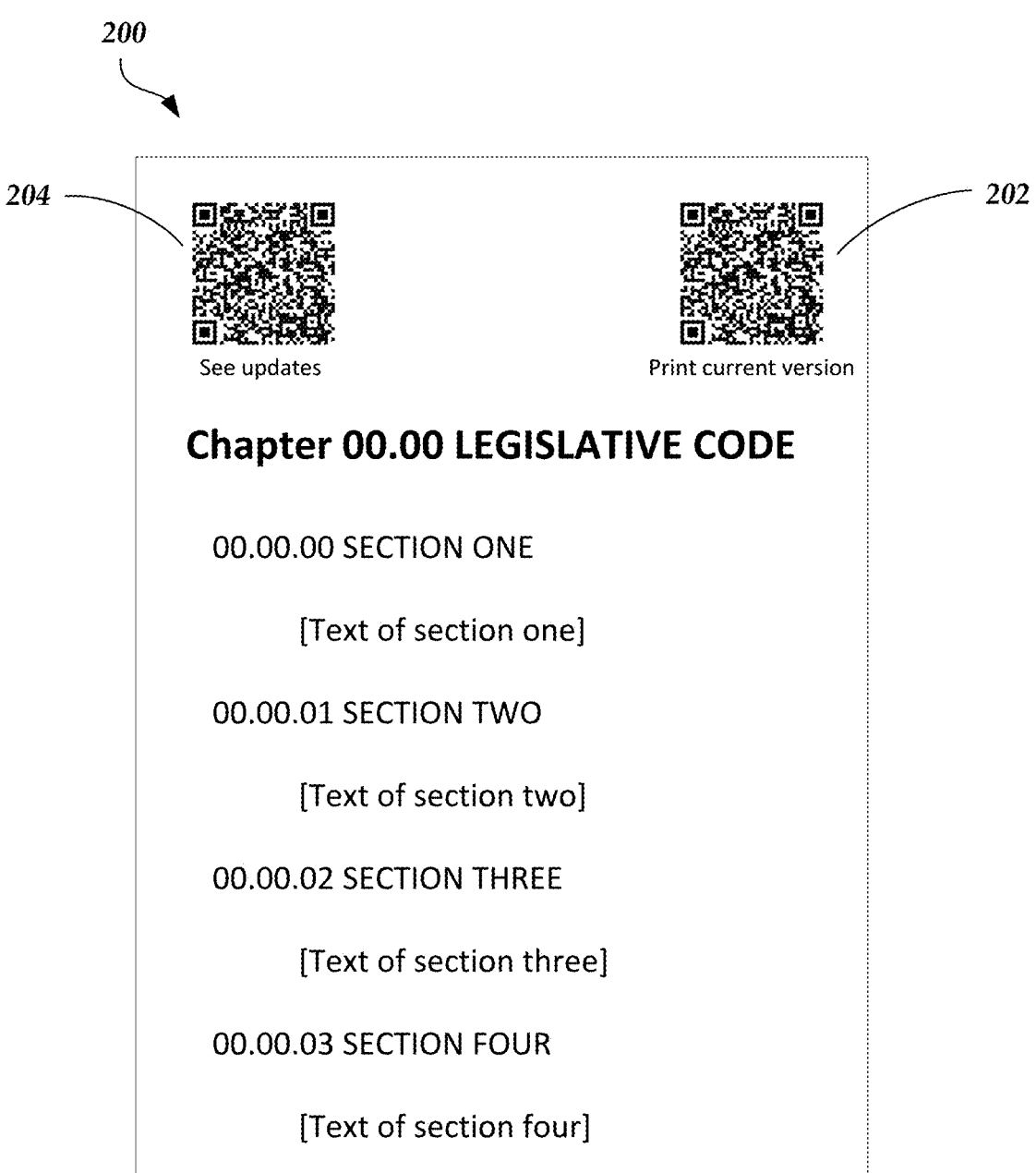
FIG. 2 illustrates a legislative code printout with CRAs.

FIG. 2 illustrates an example printable publication 200 of a legislative code that includes computer-readable addresses (CRAs) 202 and 204. When the user device 102 interacts with the CRA 202 and/or the CRA 204 (e.g., scans, captures, or otherwise reads the CRA 202 and/or the CRA 204), the user device 102 may be linked or directed to a digital copy of the printable publication 200.

For printed copies of the printable publication 200, the user device 102 may scan the CRA 202 and/or 204 with a camera. Scanning, capturing, or otherwise reading the CRA 202 and/or 204 may cause the user device 102 to be linked or directed to a digital copy of the printable publication 200. For example, scanning, capturing, or otherwise reading the CRA 202 may cause the user device 102 to open a browser application or other third party application that displays a current version of the printable publication 200 and/or that displays an option to a user to print the current version of the printable publication 200. As described herein, the current version of the printable publication 200 may not include the same content as the content included in the printable publication 200, which may be the case if a legislative body has updated the legislative code since the printable publication 200 was printed. As another example, scanning, capturing, or otherwise reading the CRA 204 may cause the user device 102 to open a browser application or other third party application that displays updates to the printable publication 200 and/or that displays an option to a user to print the updates to the printable publication 200. The displayed updates may include updates to the legislative code that have occurred since the printable publication 200 was published or may otherwise include information identifying the changes between any two versions of the legislative code. The displayed updates may include redlining or other mark-ups to indicate the changes to the legislative code.

Alternatively or in addition, the printable publication 200 may be accessed and displayed by the publishing device 130 and/or the user device 102. For example, the printable publication 200 may be available on a content page accessible via the network 110. For this digital form of the printable publication 200, the CRA 202 and/or 204 may be selectable via a user interface depicting the content page. For example, the user device 102 and/or publishing device 130 can display a user interface depicting the content page that includes the CRA 202 and/or 204, and a user can use the user device 102 to tap, click, use voice recognition, or otherwise indicate that the CRA 202 and/or 204 is to be selected. As illustrated in FIG. 2, selecting the CRA 202 may cause the user device 102 and/or publishing device 130 to open a new tab or window or to redirect an existing tab or window in a browser or third party application to a digital copy of the most recent version of the legislative code, with may include all updates made to the legislative code since the printable publication 200 was last updated. Similarly, selecting the CRA 204 may cause the user device 102 and/or publishing device 130 to open a new tab or window or to redirect an existing tab or window in a browser or third party application to a redlined version of the legislative code with notations and/or markings to reflect the changes made between different versions of the legislative code document, such as between the printable publication 200 and a most recent version of the legislative code. Additional details of the redlined version are described below in relation to FIG. 3.

In other embodiments, the CRAs 202 and/or 204 can allow a user device 102 to access a supplement for the legislative code document that can then be printed. The supplement may be a downloadable document having one or more replacement pages that includes at least one of: (1) some or all of the pages that have been modified since the printing of the legislative code (e.g., some or all of the pages that have been modified since the printable publication 200 was published, some or all of the pages that have been modified since the last printing of the legislative code, etc.); (2) a new CRA linking to an updated URL (e.g., where the updated URL may optionally include the date of the current printing of the legislative code); or (3) instructions for inserting the replacement page(s) into the existing printing (e.g., a hardcopy of the legislative code). The date of the current printing can be the date the legislative code document was generated for printing, the date the legislative code document is actually printed, the date the legislative code becomes effective, and/or the like. In yet another embodiment, the CRAs 202 and/or 204, when read by a user device 102, can cause the user device 102 to access the publications data store 125 and allow a user to select one or more versions of the legislative code document to view. In yet another embodiment, the CRAs 202 and/or 204, when read by a user device 102, can cause the user device 102 to access and display metadata associated with the legislative code document.

The CRA generator 121 may generate the CRAs 202 and/or 204 when the printable publication 200 is being generated from existing textual and sematic data in the semantic information data store 126. In other embodiments, the CRA generator 121 can generate a CRA for inclusion in a blank digital template that is later filled in with content of the legislative code, thereby allowing the legislative code documents to be tracked from their creation. The CRA generator 121, the data processor 122, and/or the code publisher 123 can embed CRAs in any publication format and the CRAs may link to any other digital publication format. In fact, the CRAs can be associated with drafts or other incomplete versions of the legislative code. Thus, these CRAs can make it easier to share documents and track changes between branches of government during the drafting and law-making process.

Although FIG. 2 depicts the CRAs 202 and/or 204 as QR codes, any computer-readable optical code can be used. In other embodiments, the link to the digital legislative code document may not be a CRA. For example, the link may be a URL or other type of network address printed on the printed publication 200. The user device 102 can scan, capture, or otherwise read the URL or other type of network address and use image recognition techniques to identify the URL text. Once identified, the user device 102 can access the URL, which causes the user device 102 to display the digital version of the legislative code document. In yet other embodiments, neither a CRA nor URL information may be included on the printable publication 200. For example, a user device 102 may use image recognition to identify the title of the printable publication 200. In yet other embodiments, a user device 102 may access the digital version of the legislative code document via an electronic beacon embedded in the printable publication 200, such as an electronic beacon that generates and transmits wirelessly an electronic signal that causes a user device 102 to access the digital version of the legislative code document when the electronic signal is received by the user device 102.

Further, the printable publication 200 may include any number of computer-readable optical codes, such as one or more computer-readable optical codes included on the same page, one or more computer-readable optical codes included on different pages, and/or any combination thereof. In embodiments with multiple computer-readable optical codes, the optical codes may have the same format or may be a combination of different optical code formats. For example, the printable publication 200 may include one or more QR codes, one or more barcodes, one or more URLs, and/or any combination thereof. In other embodiments, different versions of the printable publication 200 (e.g., the digital copy of the printable publication 200, the most updated version of the printable publication 200, and/or the redlined version of the printable publication 200) may be accessed through a single CRA.

Example Redlined Legislation Publication User Interface

Figure 3:
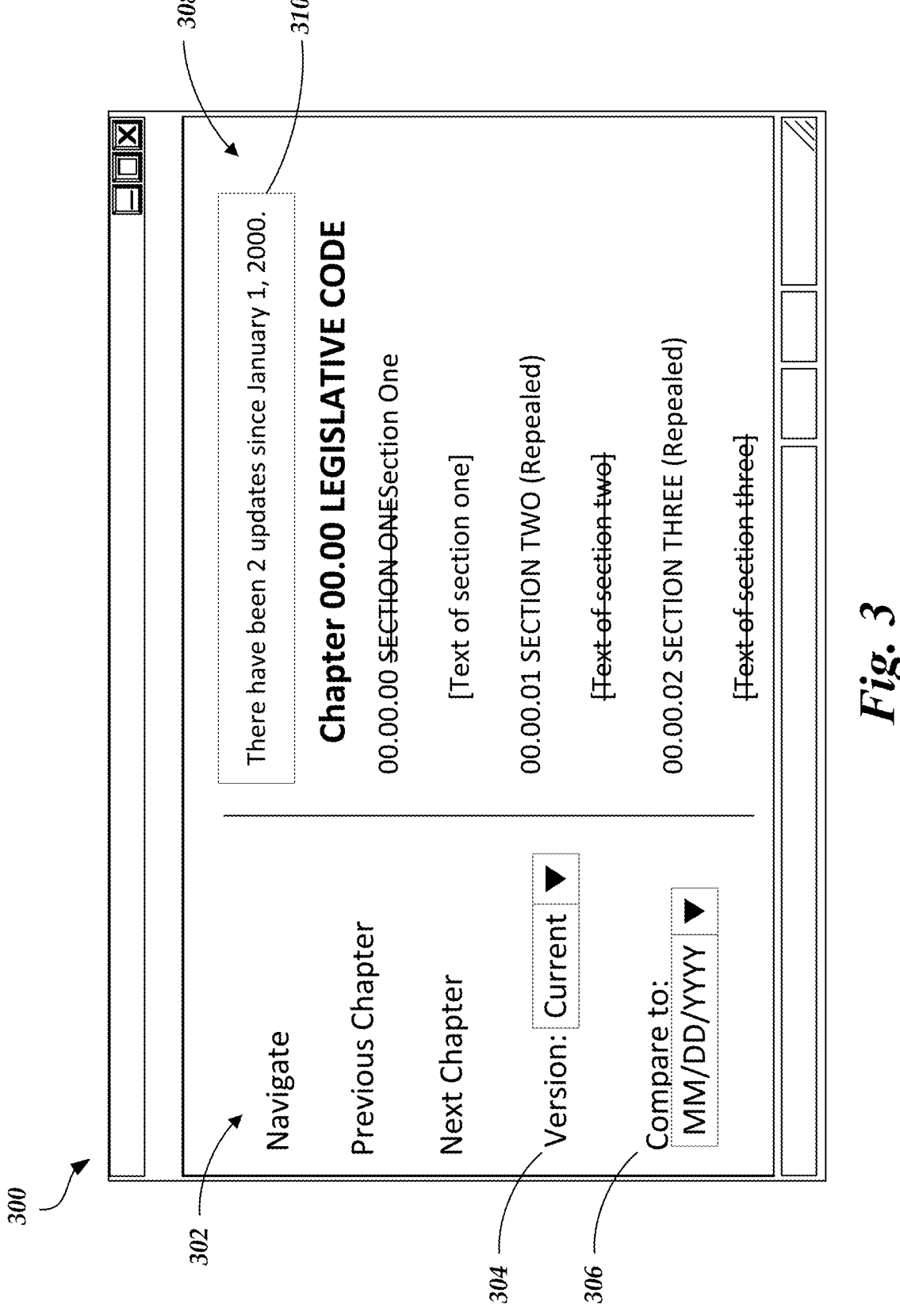
FIG. 3 illustrates a user interface displaying legislative code with comparison markings.

FIG. 3 illustrates an example user interface 300 displaying redlined legislation. The user interface 300 may be displayed by the publishing device 130 and/or the user device 102 (e.g., via user interface data provided by the version control system 120).

A user device 102 and/or publication device 130 may display the user interface 300 in response to scanning or otherwise interacting with the legislative code document's embedded CRA in a manner as described herein. The user interface 300 may include a control panel 302 and publication area 308. The control panel 302 can allow the user to navigate between chapters, titles, sections, and/or other portions of the legislative code, either by selecting a desired portion or scrolling through adjacent portions. The publication area 308 may include a revision notification 310 listing the number of changes that have occurred since the printable publication was generated. The publication area 308 may further display a redlined version of the legislative code, where the markings and notations show the changes made since the legislative code was printed. Since unique CRAs are generated for printable copies of the legislative code, scanning the embedded CRAs can allow the user device 102 and/or publishing device 130 to identify which version is associated with the printable copy and to display changes between that version and the most updated version of the legislative code.

The control panel 302 may further have a version selector 304 which can allow the user to view any version of the legislative code. When the user selects a version for viewing, the publication area 308 may be updated to display the selected version without redlines or any comparison notations. The control panel 302 may also have a comparison tool 306. The version selector 304 and comparison tool 306 may be used in conjunction to compare two versions of the legislative code. The user can select one version via the version selector 304 and a second version via the comparison tool 306, and the publication area 308 may be updated to display a redline of the legislative code, wherein the markings and notations track updates between the user selected versions.

To generate the redlined legislative code, the version control system 120 can capture changes in two primary ways. In the first method, the version control system 120 can be used to save the textual and semantic data of the legislative code document on each change. This may allow the retrieval of the state of the legislative code document at any point in time and its comparison to the state at any other point in time.

In the second method, documents can include computer-executable instructions on how to modify other documents. The version control system 120 can apply the computer-executable instructions on specific dates. The version control system 120 can then reapply the computer-executable instructions through any date to view the state of a legislative code document at any given point in time. For example, passed laws can include instructions for modifying the legislative code document and can include dates for when those instructions should be applied. The version control system 120 can then apply the instructions through any date in the past or future and output the legislative code document resulting from application of the set of instructions. The version control system 120 can compare and mark additions and subtractions of text between each version of the legislative code document to generate the redlined legislative code. With these forms of capturing changes to documents over time, every change to a document is stored and can be retrieved on demand.

Example Publication Routine

Figure 4:
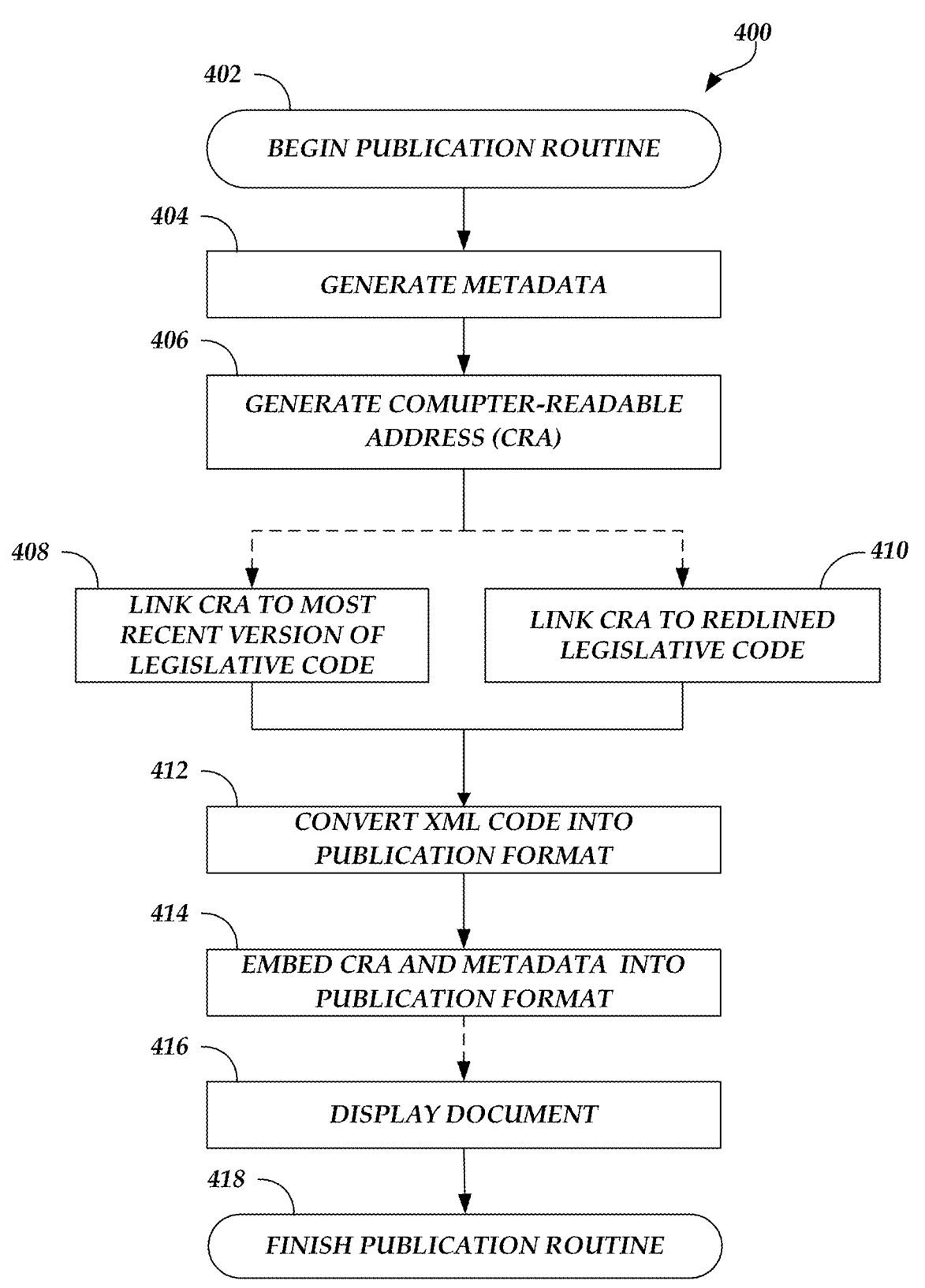
FIG. 4 is a flow diagram depicting a legislation publication routine illustratively implemented by a publishing device and/or legislation publishing system, according to one embodiment.

FIG. 4 is a flow diagram depicting a publication routine 400 illustratively implemented by a publishing device 130 and/or version control system 120, according to one embodiment. As an example, the publishing device 130 and/or version control system 120 of FIG. 1, alone or in combination, can be configured to execute the publication routine 400. The publication routine 400 can be used to generate any publication of the legislative code, including, but not limited to, printable copies of a legislative code document, such as the example depicted in FIG. 2. The publishing routine 400 begins at block 402.

At block 404, metadata is generated from the textual and semantic data of the legislative code document. For example, the publication device 130 and/or version control system 120 may process the textual and semantic data to create metadata like annotations, references, hyperlinks, to what collections the legislative code document belongs, and/or external documents referenced by the legislative code. This metadata may be used by the publication device 130 and/or version control system 120 to create various publication formats for the legislative code.

At block 406, a CRA is generated. For example, the publication device 130 and/or version control system 120 can create at least one unique CRA for each version of the legislative code document. The CRA can then be embedded into any publication of that version of the legislative code. After the CRA is generated, the publication routine 400 may proceed to block 408, block 410, or both blocks 408 and 410.

At block 410, the CRA is optionally linked to the most updated version of the legislated code, without any comparison markings. For example, the publication device 130 and/or version control system 120 can generate markup language code for updated versions of the legislative code using the process described in the '470 application.

At block 408, the CRA is optionally linked to a redlined legislative code. For example, the publication device 130 and/or version control system 120 may apply the techniques disclosed in the '470 application, with annotations that indicate differences between legislative code modifications. For instance, rather than simply replacing text from a modified legislative code, the transform may also include adding a strikethrough of the previous language being replaced and/or may include adding the newly introduced language in a different font, color, and/or format (e.g., underlining).

The CRAs of blocks 408 and 410 can link to network-accessible locations (e.g., addresses accessible via the Internet, via another public network, via a private network where only those with permission can access the digital data, etc.). Optional blocks 408 and 410 may occur individually or in conjunction. For example, as described in relation to FIG. 2, the legislative code document may be associated with one or more CRAs leading to the most updated version of the code, one or more CRAs leading to a redline comparison of the printable version and the most updated version of the legislative code, or one or more updated code CRAs and one or more redline comparison CRAs.

At block 412, the markup language code may be converted into publication format. For example, the publication device 130 and/or version control system 120 may convert the transformed markup language code into a text document, a PDF, an electronic message, and/or the like that presents the updated legislative code for publication.

At block 414, the metadata and CRAs may be embedded into the publication format. For example, the user may interact with the CRA via a user device 102 to access digital information about the legislative code. The user can access information about related documents, the most updated version of the code, a redlined copy of the legislative code, etc.

At block 416, the legislative code document is optionally displayed in any publication format. The document may be displayed by the publishing device 130 and/or the user device 102 (e.g., via user interface data provided by the version control system 120). After the code is published, the publication routine 400 ends, as shown at block 418.

One skilled in the art will appreciate that the blocks of routine 400 may be varied, combined, or separated within the scope of the present disclosure.

Additional Embodiments

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. A user device 102 may execute an application (e.g., a browser, a stand-alone or third party application, etc.) that allows a user to select and view a portion of or all of a legislative code and/or redlines of a portion of or all of a legislative code. The application may also allow the user to select an effective date of the legislative code and a date from which a user is perceiving the legislative code.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description.

All changes which come within the meaning and range of equivalency of the claims are to be embraced within their scope.

What is claimed is:

1. A computer-implemented method for versioning legislative code, the computer-implemented method comprising:

generating metadata for machine-readable data, wherein the machine-readable data comprises textual information for a first version of a legislative code;

generating a computer-readable optical code associated with the first version of the legislative code, wherein the computer-readable optical code, when read by a user device, causes the user device to access the legislative code;

converting the machine-readable data into a format compatible with a publication medium;

embedding the metadata and computer-readable optical code into the publication medium, wherein the publication medium depicts the first version of the legislative code; and in response to an indication that the user device has read the computer-readable optical code associated with the first version of the legislative code, transmitting a portion of, but not all of, a second version of the legislative code to the user device for display, wherein the portion of the second version of the legislative code transmitted to the user device for display is more recent than the first version of the legislative code and includes a printable replacement page of the legislative code, wherein the printable replacement page that depicts second content that is more recent than first content of the first version of the legislative code and that is formed based on a modification to the first content that occurred subsequent to (1) both the metadata and the computer-readable optical code being embedded into the publication medium and (2) a printing of the publication medium.

2. The computer-implemented method of claim 1, wherein the computer-readable optical code, when read by the user device, causes the user device to access the second version of the legislative code with markings indicating a difference between the first version of the legislative code and the second version of the legislative code.

3. The computer-implemented method of claim 1, wherein the computer-readable optical code, when read by the user device, causes the user device to access the second version of the legislative code without markings indicating a difference between the first version of the legislative code and the second version of the legislative code.

4. The computer-implemented method of claim 1, wherein the metadata comprises at least one of an annotation, a reference, or a hyperlink associated with the first version of the legislative code.

5. The computer-implemented method of claim 1, wherein the publication medium comprises at least one of a digital publication accessible via a network or a printable publication.

6. The computer-implemented method of claim 1, wherein the second version of the legislative code is a most recent version of the legislative code.

7. The computer-implemented method of claim 1, wherein the second version of the legislative code is a user-selected version of the legislative code.

8. The computer-implemented method of claim 1, wherein the computer-readable optical code comprises one of a quick response (QR) code, a barcode, or a uniform resource locator (URL).

9. A system for versioning legislative code, the system comprising:

memory storing computer-executable instructions; and a hardware processor in communication with the memory, wherein the computer-executable instructions, when executed by the hardware processor, cause the hardware processor to:

generate metadata for machine-readable data, wherein the machine-readable data comprises textual information for a first version of a legislative code;

generate a computer-readable optical code associated with the first version of the legislative code, wherein the computer-readable optical code, when read by a user device, causes the user device to access the legislative code;

convert the machine-readable data into a format compatible with a publication medium;

embed the metadata and computer-readable optical code into the publication medium, wherein the publication medium depicts the first version of the legislative code; and in response to an indication that the user device has read the computer-readable optical code associated with the first version of the legislative code, transmit a portion of, but not all of, a second version of the legislative code to the user device for display, wherein the portion of the second version of the legislative code transmitted to the user device for display is more recent than the first version of the legislative code and includes a printable replacement page of the legislative code, wherein the printable replacement page depicts second content that is more recent than first content of the first version of the legislative code and that is formed based on a modification to the first content that occurred subsequent to (1) both the metadata and the computer-readable optical code being embedded into the publication medium and (2) a printing of the publication medium.

10. The system of claim 9, wherein the computer-readable optical code, when read by the user device, causes the user device to access the second version of the legislative code with markings indicating a difference between the first version of the legislative code and the second version of the legislative code.

11. The system of claim 9, wherein the computer-readable optical code, when read by the user device, causes the user device to access the second version of the legislative code without markings indicating a difference between the first version of the legislative code and the second version of the legislative code.

12. The system of claim 9, wherein the metadata comprises at least one of an annotation, a reference, or a hyperlink associated with the first version of the legislative code.

13. The system of claim 9, wherein the publication medium comprises at least one of a digital publication accessible via a network or a printable publication.

14. The system of claim 9, wherein the second version of the legislative code is a most recent version of the legislative code.

15. The system of claim 9, wherein the second version of the legislative code is a user-selected version of the legislative code.

16. The system of claim 9, wherein the computer-readable optical code comprises one of a quick response (QR) code, a barcode, or a uniform resource locator (URL).

17. The system of claim 9, wherein the system comprises a version control system.

18. A non-transitory computer readable medium storing instructions, wherein the instructions, when executed by a computing device, causes the computing device to:

generate metadata for machine-readable data, wherein the machine-readable data comprises textual information for a first version of a legislative code;

generate a computer-readable optical code associated with the first version of the legislative code, wherein the computer-readable optical code, when read by a user device, causes the user device to access the first version of the legislative code or a second version of the legislative code;

convert the machine-readable data into a format compatible with a publication medium;

embed the metadata and computer-readable optical code into the publication medium, wherein the publication medium depicts the first version of the legislative code; and in response to an indication that the user device has read the computer-readable optical code associated with the first version of the legislative code, transmit a portion of, but not all of, a second version of the legislative code to the user device for display, wherein the portion of the second version of the legislative code transmitted to the user device for display is more recent than the first version of the legislative code and includes a printable replacement page of the legislative code, wherein the printable replacement page that depicts second content that is more recent than first content of the first version of the legislative code and that is formed based on a modification to the first content that occurred subsequent to (1) both the metadata and the computer-readable optical code being embedded into the publication medium and (2) a printing of the publication medium.

19. The non-transitory computer readable medium of claim 18, wherein the computer-readable optical code, when read by the user device, causes the user device to access the second version of the legislative code with markings indicating a difference between the first version of the legislative code and the second version of the legislative code.

20. The non-transitory computer readable medium of claim 18, wherein the computer-readable optical code, when read by the user device, causes the user device to access the second version of the legislative code without markings indicating a difference between the first version of the legislative code and the second version of the legislative code.

\* \* \* \* \*